US007823164B2

(12) United States Patent
Gibbs et al.

(10) Patent No.: US 7,823,164 B2
(45) Date of Patent: Oct. 26, 2010

(54) AUTOMATED GENERATION OF DIFFERENT SCRIPT VERSIONS

(75) Inventors: Matthew E. Gibbs, Redmond, WA (US); Bertrand Claude Le Roy, Bellevue, WA (US); Eilon J. Lipton, Bellevue, WA (US); Simon Calvert, Issaquah, WA (US); Nikhil Kothari, Sammamish, WA (US); Michael James Harder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 11/757,054

(22) Filed: Jun. 1, 2007

(65) Prior Publication Data

US 2008/0301702 A1    Dec. 4, 2008

(51) Int. Cl.
*G06F 13/00* (2006.01)
(52) U.S. Cl. .................. 719/313; 719/331; 709/201; 709/203; 709/217
(58) Field of Classification Search .............. 719/313, 719/331; 709/201, 203, 217
See application file for complete search history.

(56) References Cited

U.S. PATENT DOCUMENTS

| 6,247,032 B1 | 6/2001 | Bernardo et al. |
| 6,263,352 B1 | 7/2001 | Cohen |
| 6,356,908 B1 | 3/2002 | Brown et al. |
| 6,529,910 B1 | 3/2003 | Fleskes |
| 6,738,950 B1 | 5/2004 | Barnett |
| 6,886,013 B1* | 4/2005 | Beranek ............. 715/234 |
| 7,032,170 B2 | 4/2006 | Poulose et al. |
| 7,290,263 B1* | 10/2007 | Yip et al. ............... 719/313 |
| 2002/0049831 A1 | 4/2002 | Platner et al. |
| 2006/0288270 A1 | 12/2006 | Gaurav et al. |
| 2008/0083012 A1* | 4/2008 | Yu et al. ................ 726/1 |

FOREIGN PATENT DOCUMENTS

WO    WO0118656    9/2000

OTHER PUBLICATIONS

Fraternali, Piero, "Tools and Approaches for Developing Data-Intensive Web Applications: A Survey", ACM Computing Surveys, vol. 31, No. 3, Sep. 1999, pp. 227-263.
Fraternali, Piero, et al., "Model-Driven Development of Web Applications: the Autoweb System", ACM Transactions on Information Systems (TOIS) vol. 18, Issue 4 (Oct. 2000), pp. 323-382 Year of Publication: 2000.
Ceri, Stefano, et al., "Design Principles for Data-Intensive Web Sites", ACM SIGMOD Record, vol. 28, Issue 1 (Mar. 1999) pp. 84-89 Year of Publication: 1999.

\* cited by examiner

*Primary Examiner*—Andy Ho
(74) *Attorney, Agent, or Firm*—Workman Nydegger

(57) ABSTRACT

The present invention extends to methods, systems, and computer program products for automated generation of different script versions. Received scripts can include comments containing descriptive data from which instructions for implementing specified further functionality (e.g., debugging, testing, tracing, etc.) can be inferred. Received scripts can also include anonymous function names. Modules within a script pre-processor can access the descriptive data and infer instructions for implementing specified further functionality. Modules with the script preprocessor can also infer and assign global identifiers to anonymous functions such that the scripts are subsequently identifiable using the global identifiers. The modules within the script pre-processor can interoperate to generate versions of the script that implement the specified further (e.g., debugging) functionality without requiring a developer to write additional code.

20 Claims, 3 Drawing Sheets

AUTOMATED GENERATION OF DIFFERENT SCRIPT VERSIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

For example, scripts can be used to perform more complex operations than otherwise allowable using only HTML directives. Generally, scripts are executable code that can be executed at a Web server to add content to a page or can be sent down to a Web browser for execution at the Web browser to add content to a Web page. Scripts can be developed in a scripting (programming) language, such as, for example, JavaScript, VBScript, ASP, PHP, Perl, or ASP .Net. A web server can maintain pages that include both server-side and client-side scripts. Server-side scripts can be used to obtain data accessible to a Web server for inclusion in a corresponding Web page. Client side scripts are useful for acquiring and presenting data that may be unique to a client machine, such as, for example, a local time and date. However, more complex client side scripts, such as, for example, that request data or additional scripts from the Web server or other Web servers, are also possible.

When a Web server receives a Web browser request for a Web page that includes server-side script, the Web server passes the server-side script off to an appropriate script engine. The script engine processes the script to perform actions on relevant data and potentially returns portions of the relevant data, for example, represented in corresponding HTML directives. Any portions of relevant data, for example, the representative HTML directives, are then injected into a Web page for return to the Web browser (along with any client-side scripts).

For example, if a server-side script is configured to query and return 10 database rows, the script engine returns the 10 database rows in a HTML format to the Web server. The Web server then injects the HTML representing the 10 database rows into any other HTML directives and client-side scripts in the Web page. After all server-side scripts are processed, the resulting HTML from processing the server side-scripts, other HTML, and any client-side scripts are sent back to the Web browser.

Client-side scripts can be embedded in a Web page or can be included in a separate file. When a client-side script is included in an external file, a Web page can include a script reference (e.g., <script type="text/javascript" src="hello.js"></script>) referencing the script. Client-side scripts and script references can be included in-line in a Web page that is sent to a Web browser. Thus, as the Web browser processes the Web page it can encounter embedded client-side scripts as well as script references to client-side scripts.

A Web page can be designed such that tens or even hundreds of scripts are to be executed at a client when rendering a Web page. For a Web browser to execute a script, the Web browser must have an appropriate reference identifying the script. Thus, in response to a Web browser request for a Web page, a Web server typically sends down a list of client-side script references to the Web browser. If the Web browser already has access to the referenced script locally (e.g., cached from previously rendering the same Web page), the Web browser can execute the script. If the Web browser does not have access to the referenced script locally, it can download the script from the referenced location (e.g., at the Web server).

Due to the complexity of and interactions between scripts a developer may desire to debug, test, or perform other diagnostic operations for a script during script development. These types of diagnostic operations are performed to insure that a script is functioning as the developer intended. However, performing these diagnostic operations requires the developer to insert various additional debugging, testing, etc. instructions into a script. These additional instructions can perform checks, tests, etc., in various locations within the script and provide output to the developer. From the output, the developer can determine if the script is functioning as intended. The output can also provide information to assist the developer in correcting any problems within the script.

However, this requires the developer to manually maintain multiple versions of the script. For example, a developer may be required to maintain a release and a debug version of a script. Each time new functionality is to be added to the script, instructions for implementing the new functionality must be manually entered into the release and debug version of the script. Additional debugging instructions may also need to be added to the debug version of the script. Maintaining multiple script versions is burdensome to a developer. Further, due to human error, there is always some chance that instructions added to a release version of a script and a debug version of a script are not exactly the same. Thus, for example, executing a debug version of a script may not provide a precise indication of what would occur when executing the release version of the script.

Further, during runtime at least some scripting languages (e.g., JavaScript) maintain various programming elements, such as, for example, methods, anonymously. Thus when debugging, testing, or some other type of diagnostic instructions are executed it can be difficult to determine where the output from those instructions is generated (e.g., in what method). This can significantly increase the difficulty associated with debugging, testing, etc. scripts even when separate debug, test, etc., versions of a script are properly maintained.

BRIEF SUMMARY

The present invention extends to methods, systems, and computer program products for automated generation of different script versions. In some embodiments, a script pre-processor automatically adds specified functionality (e.g., debugging, testing, tracing, etc. functionality) to an existing script. The pre-processor receives a script. The script includes one or more script instructions and comments. The comments include descriptive data from which script instructions for implementing specified further functionality (e.g., debugging, testing, tracing, etc.) can be inferred.

The pre-processor receives an indication that a version of the script that implements the specified further functionality is to be created. In response to the received indication, the preprocessor parses the comments to access the descriptive data, infers additional script instructions for implementing the further specific functionality based on the accessed descriptive data, and inserts the additional script instructions into appropriate locations within the received script. The insertion of the additional script instructions modifies the script to implement the specified further functionality. The pre-processor stores the modified script so that the modified script can be executed when a version of the script including the specified further functionality is requested.

In other embodiments, a script pre-processor restructures a script to assist in implementing diagnostic functionality. The pre-processor receives a script. The script has a hierarchy of programming elements (e.g., classes, functions, etc.) that provides context for programming elements within the script relative to one another. The script includes one or more anonymous functions each including one or more script instructions. The pre-processor receives an indication that a version of the script that implements diagnostic functionality (e.g., debugging, testing, terracing, etc.) is to be created.

In response to the received indication the preprocessor automatically parses the script to identify any anonymous functions. For each identified anonymous function, the script pre-processor uses the context of the anonymous function within the script to infer a global identifier for the anonymous function and restructures the script to associate the constructed identifier with the anonymous function. Accordingly, identified anonymous functions are subsequently identifiable through reference to the constructed identifiers. The pre-processor stores the restructured script so that the restructured script can be executed when a version of the script including the diagnostic functionality is requested.

In some embodiments, automatically adding specified functionality (which can be diagnostic functionality) and restructuring to assist in implementing diagnostic functionality are both performed on a received script.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
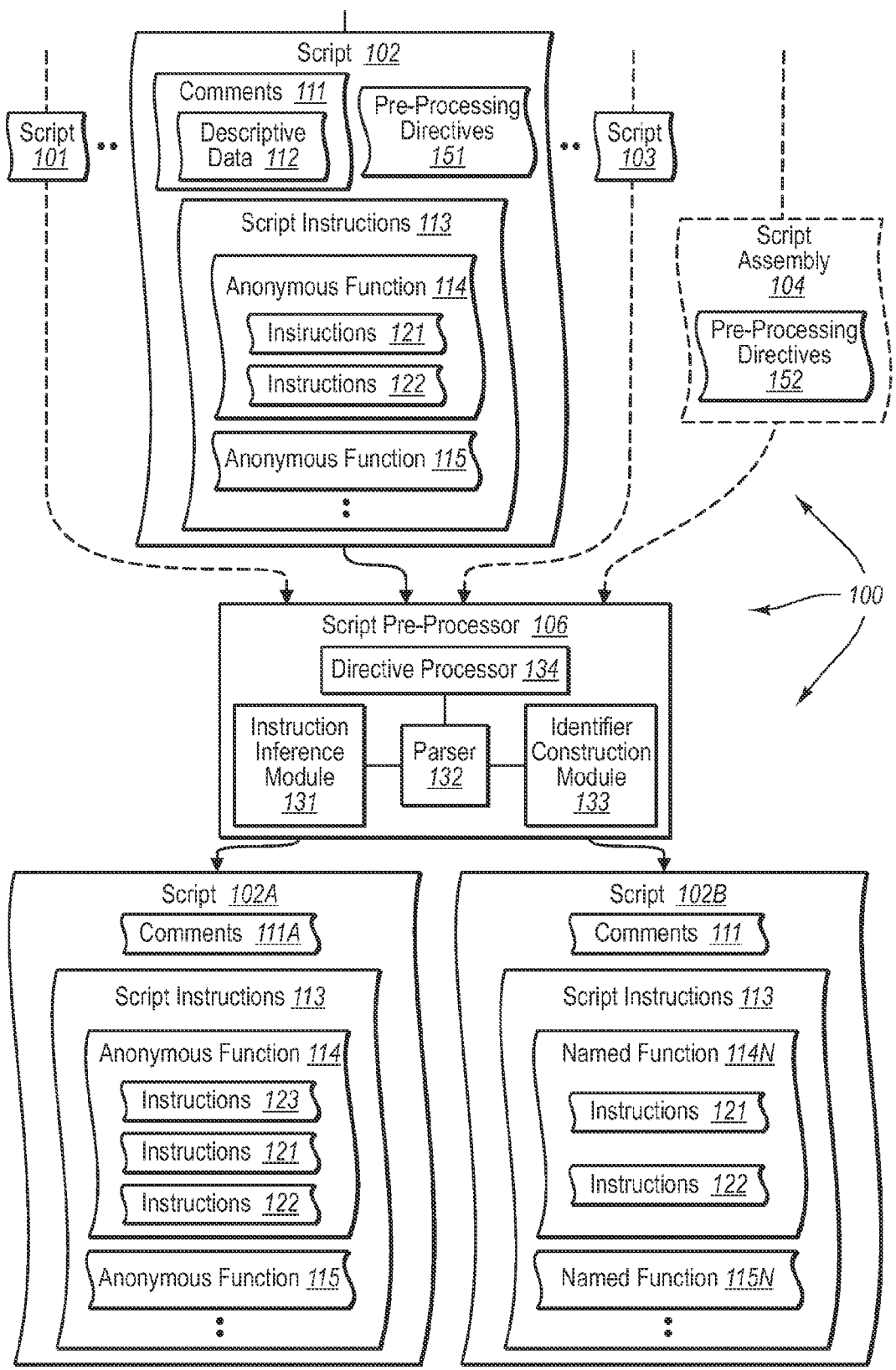
FIG. 1 illustrates an example computer architecture that facilitates automated generation of different script versions.

The present invention extends to methods, systems, and computer program products for automated generation of different script versions. In some embodiments, a script pre-processor automatically adds specified functionality (e.g., debugging, testing, tracing, etc. functionality) to an existing script. The pre-processor receives a script. The script includes one or more script instructions and comments. The comments include descriptive data from which script instructions for implementing specified further functionality (e.g., debugging, testing, tracing, etc.) can be inferred.

The pre-processor receives an indication that a version of the script that implements the specified further functionality is to be created. In response to the received indication, the preprocessor parses the comments to access the descriptive data, infers additional script instructions for implementing the further specific functionality based on the accessed descriptive data, and inserts the additional script instructions into appropriate locations within the received script. The insertion of the additional script instructions modifies the script to implement the specified further functionality. The pre-processor stores the modified script so that the modified script can be executed when a version of the script including the specified further functionality is requested.

In other embodiments, a script pre-processor restructures a script to assist in implementing diagnostic functionality. The pre-processor receives a script. The script has a hierarchy of programming elements (e.g., classes, functions, etc.) that provides context for elements within the script relative to one another. The script includes one or more anonymous functions each including one or more script instructions. The pre-processor receives an indication that a version of the script that implements diagnostic functionality (e.g., debugging, testing, terracing, etc.) is to be created.

In response to the received indication the preprocessor automatically parses the script to identify any anonymous functions. For each identified anonymous function the script pre-processor uses the context of the anonymous function within the script to infer a global identifier for the anonymous function based the identified location within the namespace and restructures the script to associate the constructed identifier with the anonymous function. Accordingly, identified anonymous functions are subsequently identifiable through reference to the constructed identifiers. The pre-processor stores the restructured script so that the restructured script can be executed when a version of the script including the diagnostic functionality is requested.

In some embodiments, automatically adding specified functionality (which can be diagnostic functionality) and restructuring to assist in implementing diagnostic functionality are both performed on a received script.

Scripts can be developed in a variety of (programming) languages, such as, for example, EcmaScript or any other programming language based on, adhering to, or extending the scripting language standardized in any edition of the ECMA-262 specification, including but not limited to: JavaScript, Jscript, DMDScript, InScript, ActionScript, etc. as well as other programming languages including but not limited to: VBScript, PHP, Perl, Python, and Ruby.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates example computer architecture 100 that facilitates automated generation of different script versions. As depicted, computer architecture 100 includes script pre-preprocessor 106 Script pre-processor can be connected to a network, such as, for example, a Local Area Network ("LAN"), a Wide Area Network ("WAN"), or even the Internet. Thus, script pre-processor 106 can receive data from and send data to other components connected to the network. Accordingly, script pre-processor 106 can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, after generating a script version, pre-processor 106 can transfer the script to a storage location managed by a script manager. The script manager can then control execution and delivery of various different versions (e.g., debug, test, trace, etc.) of the script.

As depicted script pre-processor 106 includes instruction inference module 131, parser 132, identifier construction module 133, and directive processor 134. Directive processor 134 is configured to receive and process pre-processing directives included in script files and script assembly files. For example, directive processor 134 can receive and process pre-processing directives included in JavaScript (e.g., .js) files and JavaScritpt assembly (e.g., .jsa) files.

Pre-processing directives can indicate how to process a correspondingly received script file. Pre-processing directive can be used to define and undefine symbols (e.g, #define and #undef), include files (e.g., #include), implement conditional inclusions (e.g., using #ifdef, #ifndef, #if, #endif, #else and #elif), or implement other script specific behaviors (e.g., through use of #pragma directive). Thus, pre-processing directives can indicate to script pre-processor 106 operations that are to be performed on a received script.

For example, pre-processing directives can indicate to script pre-processor 106 that a version of a script with further specific functionality, such as, for example, debugging functionality, testing functionality, tracings functionality, etc., is to be generated. Further, pre-processing directives can indicate to script pre-processor 106 that a version of a script restructured to assist in implementing diagnostic functionality is to be generated.

Parser 132 is configured to parse received scripts. Parser 132 can parse script comments to access descriptive data used to infer instructions for implementing further specific functionality. A special comment sequence, such as, for example "///" can be used to indicate that comments following the special comment sequence include descriptive data. Thus, when parser 132 detect the special sequence it is away that subsequent data (e.g., to the end of the line) is descriptive data describing how to implement further specific functionality. Parser 132 can also parse a script to identify anonymous functions. Based on pre-processing directives, directive pre-processor 134 can instruct parser 132 to parse a received script for descriptive data and/or anonymous functions.

When descriptive data is accessed, parser 132 can transfer the descriptive data to instruction inference module 131. Instruction inference module 131 is configured to infer instructions for implementing further specific functionality from received descriptive data. For example, received descriptive data can indicate the names of parameters that are to be checked for debugging a method included in a script. Based on the descriptive data, instruction inference module 131 can infer (e.g., standardized) debug instructions and can configure the instructions such that the number and values of the named parameters are checked when the method is called. If an error is detected, the inferred instructions can output a message identifying the error. Accordingly, instruction inference module 131 can automatically add additional instructions to a script to implement debugging, testing, tracing, other developer specified functionality.

When anonymous functions are identified, parser 132 can transfer the anonymous functions to identifier construction module 133. Identifier construction module 133 can identify the location of anonymous modules within a namespace defined in the script. Based on the location, identifier construction module 133 can construct a global unique identifier for an anonymous module. Identifier construction module 133 can then restructure the script to associate the global unique identifier with the anonymous function. Thus, an anonymous function is subsequently identifiable through reference to the global unique identifier. Accordingly, the global unique identifier for a function can be presented during debugging, testing, etc to indicate the location within a script where an error, test data, etc. was generated.

Scripts with instructions implementing specified additional functionality and/or that have been restructured to include global unique identifiers can be output and stored for subsequent access. Thus, in some embodiments created script versions include specified additional functionality and are restructured to associate global unique identifiers for functions.

Figure 2:
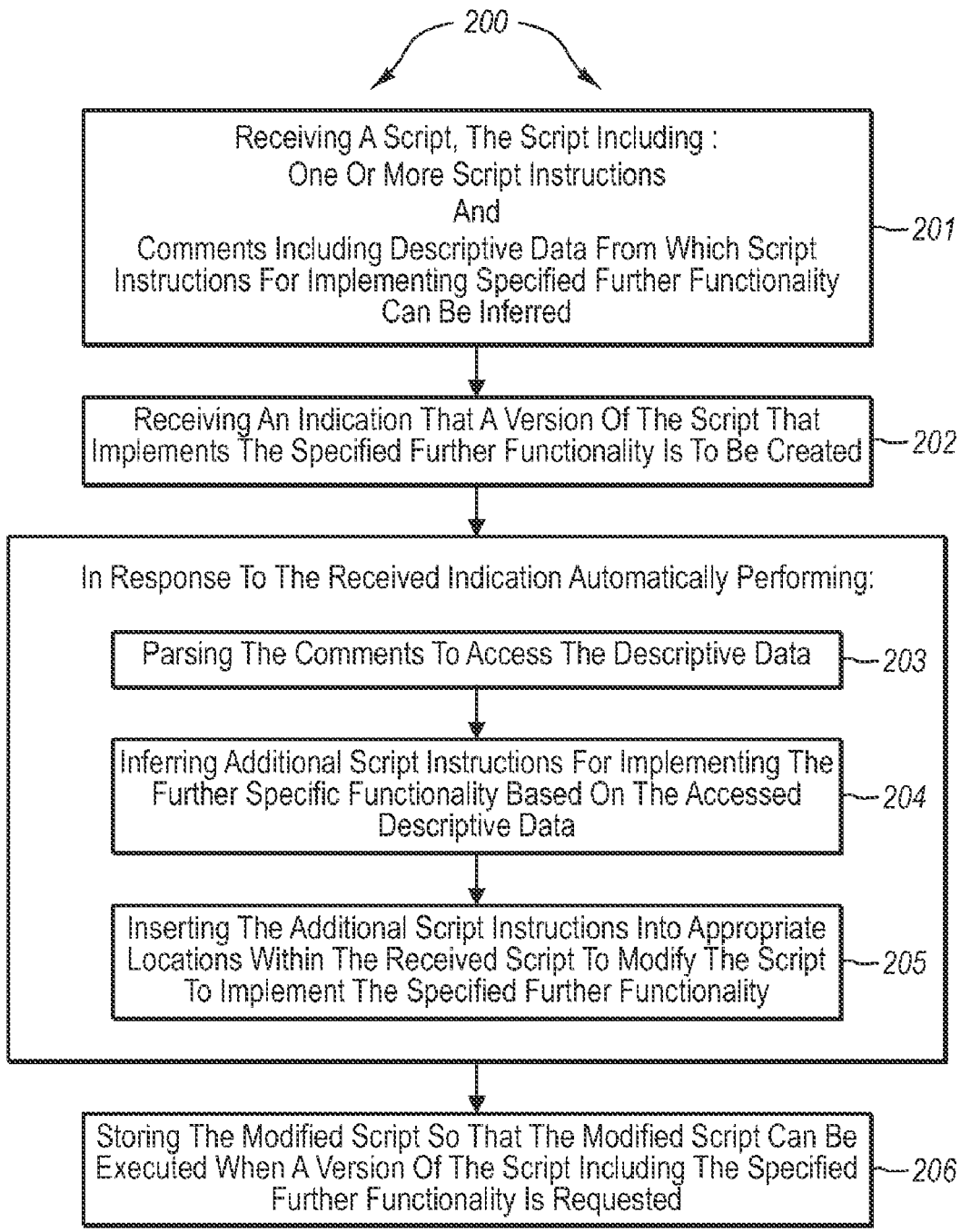
FIG. 2 illustrates a flow chart of an example method for automatically adding specified functionality to an existing script.

FIG. 2 illustrates a flow chart of an example method 200 for automatically adding specified functionality to an existing script. The method 200 will be described with respect to the components and data depicted in computer architecture 100.

Method 200 includes an act of receiving a script, the script including: one or more script instructions and comments including descriptive data (ac 301). The descriptive data can be used to infer script instructions for implementing specified further functionality. For example, script pre-processor 106 can receive script 102. As depicted, script 102 includes at least instructions 121 and 122 (and possibly a plurality of other instructions in functions 114, 115, etc). Script 102 also includes comments 111 including descriptive data 112. Descriptive data 112 can include descriptive data that a developer inserted into comments 111 describing further functionality (e.g., debugging) that can be implemented when desired (e.g., as indicated through pre-processor directives).

Method 200 includes an act of receiving an indication that a version of the script that implements the specified further functionality is to be created (act 202). For example, based on pre-processing directives 151 pre-processor 134 can determine that a debug version of script 102 is to be generated. Directive pre-processor 134 can indicate to parser 132 that script 102 is to be parsed for descriptive data.

Parser 132 can receive the indication from directive pre-processor 134. In response to the received indication, method 200 includes an act of automatically parsing the comments to access the descriptive data (act 203). For example, parser 132 can automatically parse comments 111 to access descriptive data 112. Parser 132 can transfer descriptive data 133 to instruction inference module 131.

Method 200 includes an act of automatically inferring additional script instructions for implementing the further specific functionality based on the accessed descriptive data (act 204). For example, instruction inference module 131 can infer instructions 123 from descriptive data 112. Instructions 123 can be instructions for debugging function 114. Method 200 includes an act of automatically inserting the additional script instructions into appropriate locations within the received script to modify the script to implement the specified further functionality (act 205). For example, instruction inference module 131 can insert instructions 123 into function 114. Instructions 123 modify script 102A to implement debugging functionality for function 114.

Comments 111A can also be included in script 102A. Comments 111A can indicate similar information to comments 111.

Method 200 includes an act of storing the modified script so that the modified script can be executed when a version of the script including the specified further functionality is requested (act 206). For example, script pre-processor 106 can store script 102A so that script 102A can be executed when a debug version of script 102 is requested (e.g., by a script manager).

Figure 3:
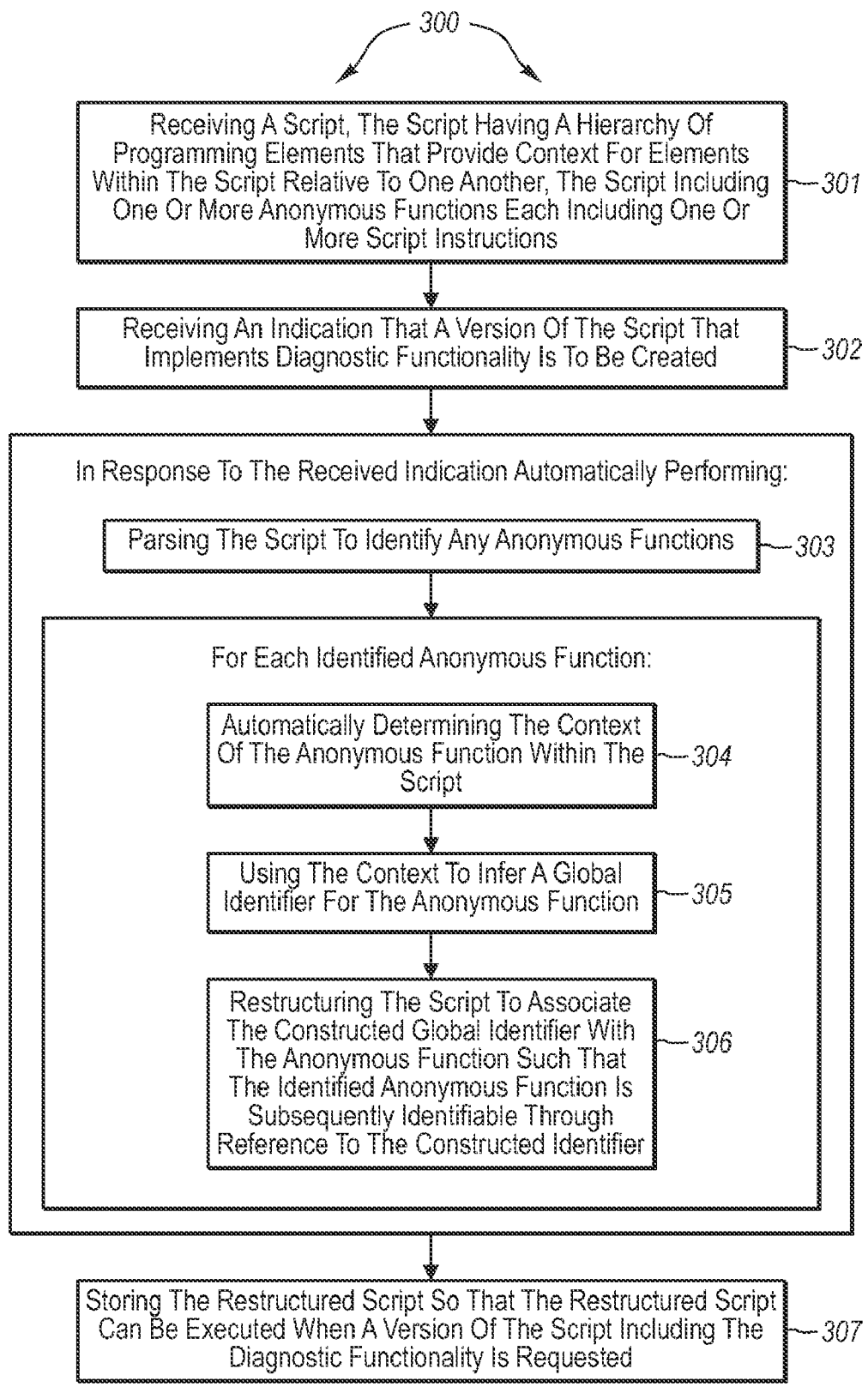
FIG. 3 illustrates a flow chart of an example method for restructuring a script to assist in implementing diagnostic functionality.

FIG. 3 illustrates a flow chart of an example method 300 for restructuring a script to assist in implementing diagnostic functionality. The method 300 will be described with respect to the components and data depicted in computer architecture 100.

Method 300 includes an act of receiving a script, the script has a hierarchy of programming elements (e.g., classes, functions, etc.) that provides context for elements within the script relative to one another, the script including one or more anonymous functions each including one or more script instructions (act 301). For example, script pre-processor 106 can receive script 102. Script 102 includes one or more anonymous functions including anonymous functions 114 and 115. Script 102 can have a hierarchy of program elements, such, as for example, a namespace (e.g., sys.<element>.) and other data that provides context for programming elements within script instructions 113 (e.g., anonymous functions 114 and 115) relative to one another.

Method 300 includes an act of receiving an indication that a version of the script that implements diagnostic functionality is to be created (act 302). For example, based on pre-processing directives 151 pre-processor 134 can determine that a debug version of script 102 is to be generated. Directive pre-processor 134 can indicate to parser 132 that script 102 is to be parsed for anonymous function names.

In response to the received indication method 300 includes an act of automatically parsing the script to identify any anonymous functions (act 303). For example, parser 132 can parse script instructions 113 to identify anonymous functions 114 and 115. Parser can transfer identified anonymous functions 114 and 115 to identifier construction module 133.

For each identified anonymous function, method 300 includes an act of automatically determining the context of the anonymous function within the script (act 304). For example, identifier construction module 133 can automatically determine the context of anonymous functions 114 and 115 within script instructions 113. The context of anonymous functions 114 and 115 can be inferred from the natural flow of script instructions 113. Thus, identifier construction module 133 can automatically determine the context of anonymous functions 114 and 115 without a developer having to add instructions to expressly include context information.

For each identified anonymous function, method 300 includes an act of using the context to infer a global identifier for the anonymous function (act 305). For example, identifier construction module 133 can infer global identifiers for anonymous functions 114 and 115 based on their context within script instructions 113.

For each identified anonymous function, method 300 includes an act of restructuring the script to associate the constructed global identifier with the anonymous function such that the identified anonymous function is subsequently identifiable through reference to the constructed identifier (act 306). For example, identifier construction module 133 can restructure script 102 as script 102B to associate global identifiers with anonymous functions 114 and 115. In some embodiments, identifier construction module 133 can name the functions according to the global identifiers resulting in named functions 114N and 115N. Accordingly, anonymous functions 114 and 115 are subsequently identifiable through reference to the constructed global identifiers 114N and 115N.

Method 300 includes an act of storing the restructured script so that the restructured script can be executed when a version of the script including the diagnostic functionality is requested (act 307). For example, script pre-processor 106 can store script 102B so that script 102B can be executed when a version of script 102 implementing diagnostic functionality is requested (e.g., by a script manager).

Although, embodiments of the invention have be described with respect to single script it should be understood that embodiments of the invention can be practiced on a plurality of scripts that are part of a common framework or application. For example, script assembly 104 can include pre-processing directives 152. Pre-processing directive 152 can indicate that versions with further specific functionality and/or that are restructured to name anonymous functions are to be generated for a plurality of scripts, including scripts 101, 102 and 103. Thus, directive processor 134, parser 132, instruction inference module 131, and identifier construction module 133 can interoperate to comply with indications in pre-processing directives 152 for each of the plurality of scripts.

Following are code examples that further illustrate the principles of the present invention. The following first code example depicts code for a JavaScript Class that can be written by a developer. The first code example includes comments with descriptive data from which instructions for implementing specified further functionality can be inferred.

```
Sys.StringBuilder = function(initialText) {
    /// <summary>Provides an optimized mechanism to concatenate a sequence of strings.</summary>
    /// <param name="initialText" optional="true" mayBeNull="true">The initial text for the
StringBuilder.</param>
    this._parts = (typeof(initialText) !== 'undefined' && initialText !== null && initialText !== '') ?
        [initialText.toString()] : [ ];
    this._value = { };
    this._len = 0;
}
Sys.StringBuilder.prototype = {
    append: function(text) {
        /// <summary>Appends a new string at the end of the StringBuilder.</summary>
        /// <param name="text" mayBeNull="true">The string to append.</param>
        this._parts[this._parts.length] = text;
    },
    appendLine: function(text) {
        /// <summary>Appends a new string as a line of text at the end of the StringBuilder.</summary>
        /// <param name="text" optional="true" mayBeNull="true">The string to append.</param>
        this._parts[this._parts.length] =
            ((typeof(text) === 'undefined') || (text === null) || (text === '')) ?
            '\r\n' : text + '\r\n';
    },
    clear: function( ) {
        /// <summary>Clears the StringBuilder of its current contents.</summary>
        this._parts = [ ];
        this._value = { };
        this._len = 0;
    },
    isEmpty: function( ) {
        /// <summary>Use this method to determine if the StringBuilder has contents.</summary>
        /// <returns type="Boolean">True if the StringBuilder has any contents.</returns>
        if (this._parts.length === 0) return true;
        return this.toString( ) === '';
    },
    // separator may be null, to match behavior of ECMA Array.join(separator) and
    // .NET String.Join(separator, value)
    toString: function(separator) {
```

-continued

```
/// <summary>Creates a string from the contents of the StringBuilder.</summary>
/// <param name="separator" type="String" optional="true" mayBeNull="true">
///    The separator to insert between the elements of the StringBuilder.
/// </param>
/// <returns type="String">The string built from the StringBuilder.</returns>
    separator = separator || "";
    var parts = this._parts;
    if (this._len !== parts.length) {
        this._value = { };
        this._len = parts.length;
    }
    var val = this._value;
    if (typeof(val[separator]) === 'undefined') {
        if (separator !== "") {
            for (var i = 0; i < parts.length;) {
                if ((typeof(parts[i]) === 'undefined') || (parts[i] === "") || (parts[i] === null)) {
                    parts.splice(i, 1);
                }
                else {
                    i++;
                }
            }
        }
        val[separator] = this._parts.join(separator);
    }
    return val[separator];
  }
}
Sys.StringBuilder.registerClass('Sys.StringBuilder');
```

As depicted, lines starting with "//" indicate informational data describing the functionality of the depicted functions. Lines starting with "///" indicate descriptive data that can be used to implement specified further functionality for the functions. Also as depicted, functions are identified using the word "function" but are not named. The namespace for the first code example is "Sys". "StringBuilder" is a class name. From these two portions of data, the fully-qualified name "Sys.StringBuilder" can be inferred for the class "StringBuilder".

Embodiments of the invention, including interoperation between directive processor 134, parser 132, instruction inference module 131, and identifier construction module 133, can generate the second following code example. The second code example includes debugging functionality and also includes named functions.

```
Sys.StringBuilder = function Sys$StringBuilder(initialText) {
    /// <summary locid="M:Sys.StringBuilder.#ctor" />
    /// <param name="initialText" optional="true" mayBeNull="true"
locid="Param:Sys.StringBuilder.#ctor.initialText"></param>
    var e = Function._validateParams(arguments, [
        {name: "initialText", mayBeNull: true, optional: true}
    ]);
    if (e) throw e;
    this._parts = (typeof(initialText) !== 'undefined' && initialText !== null && initialText !== "") ?
        [initialText.toString()] : [ ];
    this._value = { };
    this._len = 0;
}
    function Sys$StringBuilder$append(text) {
        /// <summary locid="M:Sys.StringBuilder.append" />
        /// <param name="text" mayBeNull="true"
locid="Param:Sys.StringBuilder.append.text"></param>
        var e = Function._validateParams(arguments, [
            {name: "text", mayBeNull: true}
        ]);
        if (e) throw e;
        this._parts[this._parts.length] = text;
    }
    function Sys$StringBuilder$appendLine(text) {
        /// <summary locid="M:Sys.StringBuilder.appendLine" />
        /// <param name="text" optional="true" mayBeNull="true"
locid="Param:Sys.StringBuilder.appendLine.text"></param>
        var e = Function._validateParams(arguments, [
            {name: "text", mayBeNull: true, optional: true}
        ]);
        if (e) throw e;
        this._parts[this._parts.length] =
            ((typeof(text) === 'undefined') || (text === null) || (text === "")) ?
```

-continued

```
            '\r\n' : text + '\r\n';
    }
    function Sys$StringBuilder$clear( ) {
        /// <summary locid="M:Sys.StringBuilder.clear" />
        if (arguments.length !== 0) throw Error.parameterCount( );
        this._parts = [ ];
        this._value = { };
        this._len = 0;
    }
    function Sys$StringBuilder$isEmpty( ) {
        /// <summary locid="M:Sys.StringBuilder.isEmpty" />
        /// <returns type="Boolean" locid="Returns:Sys.StringBuilder"></returns>
        if (arguments.length !== 0) throw Error.parameterCount( );
        if (this._parts.length === 0) return true;
        return this.toString( ) === '';
    }
    function Sys$StringBuilder$toString(separator) {
        /// <summary locid="M:Sys.StringBuilder.toString" />
        /// <param name="separator" type="String" optional="true" mayBeNull="true"
    locid="Param:Sys.StringBuilder.toString.separator"></param>
        /// <returns type="String" locid="Returns:Sys.StringBuilder"></returns>
        var e = Function._validateParams(arguments, [
            {name: "separator", type: String, mayBeNull: true, optional: true}
        ]);
        if (e) throw e;
        separator = separator || '';
        var parts = this._parts;
        if (this._len !== parts.length) {
            this._value = { };
            this._len = parts.length;
        }
        var val = this._value;
        if (typeof(val[separator]) === 'undefined') {
            if (separator !== '') {
                for (var i = 0; i < parts.length;) {
                    if ((typeof(parts[i]) === 'undefined') || (parts[i] === '') || (parts[i] === null)) {
                        parts.splice(i, 1);
                    }
                    else {
                        i++;
                    }
                }
            }
            val[separator] = this._parts.join(separator);
        }
        return val[separator];
    }
    Sys.StringBuilder.prototype = {
        append: Sys$StringBuilder$append,
        appendLine: Sys$StringBuilder$appendLine,
        clear: Sys$StringBuilder$clear,
        isEmpty: Sys$StringBuilder$isEmpty,
        toString: Sys$StringBuilder$toString
    }
    Sys.StringBuilder.registerClass('Sys.StringBuilder');
```

As depicted, each of the functions in the second code example is named according to their context within the "Sys.StringBuilder" namespace. Further each function includes debugging code (i.e., parameter validation code) that was inferred from descriptive data contained in comments of the first code example. For example, the parameter validation code:

```
    var e = Function._validateParams(arguments, [
        {name: "text", mayBeNull: true}
    ]);
    if (e) throw e;
    is included for the function named "Sys$StringBuilder$append"
```

Pre-processing directives can also be used to indicate that a plurality of versions of a script each with different functionality is to be created. For example, pre-processor directives can indicate that a release version and a debug version of a script are to be created. Script pre-processor can implement various compaction and optimization techniques to increase efficiency when executing a release version of a script.

For example the following third code example is an example of a release version of a script that can be created for the script in the first code example.

```
Sys.StringBuilder=function(a){this._parts=typeof
a!=="undefined"&&a!==null&&a!==" "?[a.toString( )]:[ ];
this._value={ };this._len=0};
Sys.StringBuilder.prototype={append:function(a)
{this._parts[this._parts.length]=a},
appendLine:function(a){this._parts[this._parts.length]=typeof
a==="undefined"||a===null||a===
```

-continued

```
" "?"\r\n":a+"\r\n"},clear:function( )
{this.__parts=[ ];this.__value={ };
this.__len=0},isEmpty:function( )
{if(this.__parts.length===0)return true;return
this.toString( )==="},toString:function(a){a=a||" ";
var b=this.__parts;if(this.__len!==b.length)
{this.__value={ };this.__len=b.length}var
d=this.__value;if(typeof d[a]==="undefined"){
if(a!==" ")for(var c=0;c<b.length;)if(typeof
b[c]==="undefined"||b[c]===" "||
b[c]===null)b.splice(c,1);
else c++;d[a]=this.__parts.join(a)}return
d[a]}};Sys.StringBuilder.registerClass("Sys.StringBuilder");
```

Within the third code example, the script is compacted to minimize size, local variables are renamed to minimize size, comments are stripped out, and no parameter validation Accordingly, embodiments of the invention facilitate a development model that allows component developers to create a single source code for a script that can then be used to supply a variety of different end user experiences, such as, for example, performance or development support like debugging.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a script pre-processor, a method for automatically adding specified functionality to an existing script, the method comprising:
   an act of receiving a script, the script including:
      one or more script instructions; and
      comments including descriptive data from which script instructions for implementing specified further functionality can be inferred;
   an act of receiving an indication that a version of the script that implements the specified further functionality is to be created;
   in response to the received indication automatically performing:
      an act of parsing the comments to access the descriptive data;
      an act of inferring additional script instructions for implementing the further specific functionality based on the accessed descriptive data; and
      an act of inserting the additional script instructions into appropriate locations within the received script to modify the script to implement the specified further functionality; and
   an act of storing the modified script so that the modified script can be executed when a version of the script including the specified further functionality is requested.

2. The method as recited in claim 1, wherein the act of receiving a script comprises an act of receiving an EcmaScript file.

3. The method as recited in claim 1, wherein the act of receiving a script comprises an act of accessing one or more EcmaScript files referenced in a EcmaScript Assembly.

4. The method as recited in claim 1, wherein the act of receiving a script comprises an act of receiving a script including descriptive data from which script instructions for implementing debug functionality can be inferred.

5. The method as recited in claim 1, wherein the act of receiving an indication that a version of the script that implements the specified further functionality is to be created comprises an act of receiving an indication that a debug version of the received script is to be created.

6. The method as recited in claim 5, further comprising:
   an act of receiving an indication that a release version of the received script is also to be created.

7. The method as recited in claim 1, wherein the act of inferring additional script instructions for implementing the further specific functionality based on the accessed descriptive data comprises an act of inferring debug instructions for implementing debug functionality from the accessed descriptive data.

8. The method as recited in claim 1, wherein the act of inserting the additional script instructions into appropriate locations within the received script to modify the script to implement the specified further functionality comprises an act of inserting debug instructions into the received script.

9. The method as recited in claim 1, wherein the act of storing the modified script so that the modified script can be executed when a version of the script including the specified further functionality is requested comprises an act of storing a debug version of the script including debug functionality such that debug version of the script that can be executed when debug functionality is requested.

10. The method as recited in claim 1, further comprising:
    an act of also storing a release version of the received script.

11. The method as recited in claim 1 further comprising
    in response to the received indication, automatically performing:
       an act of parsing the received script to identify any anonymous functions; and
       for each identified anonymous function:
          an act of automatically determining the context of the anonymous function within the received script;
          an act of using the context to infer a global identifier for the anonymous function; and
          an act of restructuring the modified script to associate the constructed identifier with the anonymous function prior to storing the modified script such that the identified anonymous function is subsequently identifiable through reference to the constructed identifier.

12. At a computer system including a script pre-processor, a method for restructuring a script to assist in implementing diagnostic functionality, the method comprising:
    an act of receiving a script, the script having a hierarchy of programming elements that provides context for elements within the script relative to one another, the script including one or more anonymous functions each including one or more script instructions;
    an act of receiving an indication that a version of the script that implements diagnostic functionality is to be created;
    in response to the received indication automatically performing:
       an act of parsing the script to identify any anonymous functions; and
       for each identified anonymous function:
          an act of automatically determining the context of the anonymous function within the script;
          an act of using the context to infer a global identifier for the anonymous function; and
          an act of restructuring the script to associate the constructed global identifier with the anonymous function such that the identified anonymous function is subsequently identifiable through reference to the constructed identifier; and an act of storing the restructured script so that the restructured script can be executed when a version of the script including the diagnostic functionality is requested.

13. The as recited in claim 12, wherein the act of receiving a script comprises an act of receiving a script that includes an EcmaScript class.

14. The method as recited in claim 12, wherein the act of receiving an indication that a version of the script that implements diagnostic functionality is to be created comprises an act of receiving an indication that a debug version of the script that implements debug functionality is to be created.

15. The method as recited in claim 14, further comprising:
an act of receiving an indication that a release version of the script is to be created along with the debug version of the script.

16. The method as recited in claim 12, wherein the act of automatically determining the context of anonymous function comprises an act of identifying the context of the anonymous function within a namespace.

17. The method as recited in claim 16, wherein the act of using the context to infer a global identifier for the anonymous function comprises an act of constructing a global identifier for the anonymous function based on the context of the anonymous function.

18. The method as recited in claim 12 wherein the act of restructuring the script to associate the constructed global identifier with the anonymous function comprises assigning the constructed global identifier as the name of the function.

19. The method as recited in claim 12, wherein the act of storing the restructured script so that the restructured script can be executed when a version of the script including the diagnostic functionality is requested comprises an act storing a debug version of the script so that the debug version script can be executed when a version of the script including the debug functionality is requested.

20. A computer system, including:
one or more processors;
system memory;
one or more physical storage media have stored therein computer-executable instructions representing a script pre-processor for processing pre-processor directives, the script pre-processor including a parser, an instruction inference module, and an identifier construction module, the parser configured to:
receiving a script, the script having comments that include descriptive data from which script instructions for implementing specified further functionality can be inferred and the script having a hierarchy of programming elements that provides context for elements within the script relative to one another parsing comments included in the script to access descriptive data from which script instructions for implementing specified further functionality can be inferred; and parse the script to identify any anonymous functions;

the instruction inference module configured to:
infer additional script instructions for implementing further specific functionality based on accessed descriptive data; and inserting the additional script instructions into appropriate locations within a received script to modify the script to implement the specified further functionality;

the identifier construction module configured to:
determine the context of anonymous functions within the received script;

use the context to infer global identifiers for the anonymous functions; and restructure the script to associate the constructed identifiers with the anonymous functions such that the identified anonymous functions are subsequently identifiable through reference to the constructed identifiers; and the script pre-processor configured to:
store the modified and restructured scripts so that the modified and restructured scripts can be executed when a version of the script including the specified further functionality is requested.

* * * * *